US012104780B2

(12) United States Patent
Liu et al.

(10) Patent No.: US 12,104,780 B2
(45) Date of Patent: Oct. 1, 2024

(54) LIGHT GUIDE STRUCTURE OF EARPHONE CHARGING CASE

(71) Applicant: GUOGUANG ELECTRIC COMPANY LIMITED, Guangzhou (CN)

(72) Inventors: Zhenhua Liu, Guangzhou (CN); Junming Liu, Guangzhou (CN); Rong Huang, Guangzhou (CN)

(73) Assignee: Guoguang Electric Company Limited, Guangzhou (CN)

( * ) Notice: Subject to any disclaimer, the term of this patent is extended or adjusted under 35 U.S.C. 154(b) by 0 days.

(21) Appl. No.: 18/324,162

(22) Filed: May 26, 2023

(65) Prior Publication Data

US 2024/0200770 A1 Jun. 20, 2024

(30) Foreign Application Priority Data

Dec. 16, 2022 (CN) .......................... 202223388376.3

(51) Int. Cl.
*F21V 33/00* (2006.01)
*F21V 8/00* (2006.01)
(Continued)

(52) U.S. Cl.
CPC ........ *F21V 33/0056* (2013.01); *G02B 6/0076* (2013.01); *G02B 6/262* (2013.01);
(Continued)

(58) Field of Classification Search
CPC ............. F21V 33/0056; F21V 2200/00; G02B 6/0076; G02B 6/262; H04R 1/1025; F21Y 2115/10; H02L 7/0044; G04R 2460/17
(Continued)

(56) References Cited

U.S. PATENT DOCUMENTS 9,134,231 B2  9/2015 Wang
2018/0098144 A1* 4/2018 Thoen .................. H04R 1/1025
(Continued)

FOREIGN PATENT DOCUMENTS

CN       207340115 U  *  5/2018

OTHER PUBLICATIONS

English Translation of CN 207340115 U (To Xu et al.,) (Year: 2018).*

*Primary Examiner* — Elmito Breval
*Assistant Examiner* — Hana S Featherly
(74) *Attorney, Agent, or Firm* — Byrne Poh LLP

(57) ABSTRACT

The present utility model belongs to the technical field of charging cases, and discloses a light guide structure of an earphone charging case, including a charging case and earphones. A shell of the charging case is provided with a shell light guide element, and the element penetrates the shell. The earphone is provided with a light source. When the earphone is placed in the charging case, light generated by the earphone light source can be transmitted to the shell light guide element, making the guide element emits light. The light guide structure of the earphone charging case use the light source of the earphone directly through optical simulation so as to realize secondary light guide, so that the shell of the charging case emits light, no additional light source is required, costs are reduced, the size of charging case can be effectively reduced, and miniaturization and lightweight can be realized.

16 Claims, 2 Drawing Sheets

(51) Int. Cl.
  *G02B 6/26* (2006.01)
  *H04R 1/10* (2006.01)
  *F21Y 115/10* (2016.01)
  *H02J 7/00* (2006.01)
(52) U.S. Cl.
  CPC ........ *H04R 1/1025* (2013.01); *F21V 2200/00* (2015.01); *F21Y 2115/10* (2016.08); *H02J 7/0044* (2013.01); *H04R 2460/17* (2013.01)
(58) Field of Classification Search
  USPC .......................................................... 362/86
  See application file for complete search history.

(56) References Cited

U.S. PATENT DOCUMENTS

| | | | |
|---|---|---|---|
| 2020/0304899 A1* | 9/2020 | Cramer | A45C 15/00 |
| 2021/0085047 A1* | 3/2021 | Wright | A45C 13/02 |

\* cited by examiner

LIGHT GUIDE STRUCTURE OF EARPHONE CHARGING CASE

TECHNICAL FIELD

The present utility model relates to the technical field of charging cases, in particular to a light guide structure of an earphone charging case.

DESCRIPTION OF RELATED ART

For light emitting of a shell of an existing earphone charging case, a light-emitting diode (LED) light source is generally designed on the shell of the charging case. The LED light source generates light, and the light is condensed by a condensing module and then transmitted to a light guide area of the shell by a light guide element, so that the light guide area emits light. The earphone charging case has a complex structure and high costs, which are not conducive to miniaturization and lightweight of the charging case.

SUMMARY

An objective of the present utility model is to provide a light guide structure of an earphone charging case, so that the charging case having a simple structure and low costs may emit light without a light source.

In order to achieve this objective, the present utility model employs the following technical solution:

A light guide structure of an earphone charging case includes:
- a charging case, where a shell of the charging case is provided with a shell light guide element, and the shell light guide element penetrates the shell; and
- earphones, where the earphone is provided with a light source, and the light source is capable of transmitting light to the shell light guide element when emitting light, so that the shell light guide element emits light.

As an alternative, the shell light guide element includes an inner light guide element and an outer light guide element, the inner light guide element is embedded in an inner wall of the shell, the outer light guide element is embedded in an outer wall of the shell, and the inner light guide element is capable of transmitting the light to the outer light guide element.

As an alternative, a cross-sectional area of the inner light guide element is greater than that of the outer light guide element.

As an alternative, the light source is provided with an earphone light guide element, and for the earphone light guide element, the light generated by the light source may be transmitted to the shell light guide element through the earphone light guide element.

As an alternative, the earphone light guide element is L-shaped, the light source is disposed at an entry end of the earphone light guide element, and the light generated by the light source is refracted by 90° and is emitted from an exit end of the earphone light guide element.

As an alternative, an outer corner of the earphone light guide element is provided with an inclined surface.

As an alternative, an outer surface of the earphone light guide element is machined through a mirror polishing process.

As an alternative, a distance H between the exit end of the earphone light guide element and a portion, protruding from the inner wall of the shell, of the shell light guide element is 4 mm-7 mm.

As an alternative, the shell light guide element has a transmittance of 50%, and the earphone light guide element has a transmittance of 80%.

As an alternative, the earphones are both provided with the light sources.

The present utility model has the following beneficial effects:

The light guide structure of an earphone charging case, provided by the present utility model, includes the charging case and the earphones, where the shell of the charging case is provided with the shell light guide element, and the shell light guide element penetrates the shell. The earphone is provided with the light source, and when the earphone is placed in the charging case, light generated by the light source on the earphone may be transmitted to the shell light guide element, so that the shell light guide element emits light. According to the light guide structure of an earphone charging case, the light source of the earphone is directly used through optical simulation so as to realize secondary light guide, so that the shell of the charging case emits light, no additional light source is required, costs are reduced, a size of the charging case may be effectively reduced, and miniaturization and lightweight may be realized.

Figure 1:
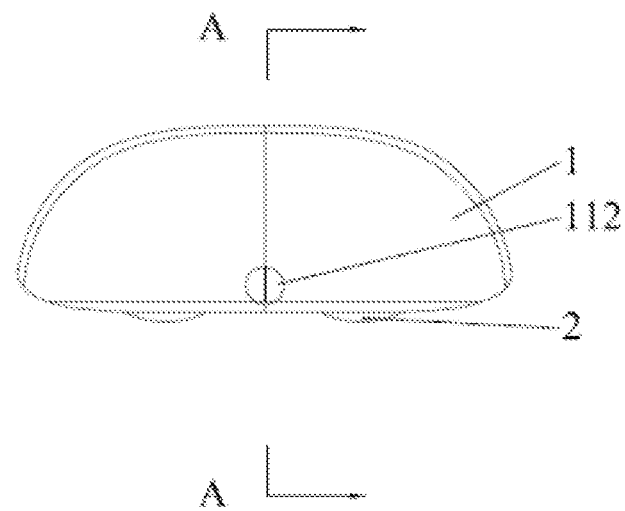
FIG. 1 is a first schematic structural diagram of a light guide structure of an earphone charging case according to an embodiment of the present utility model.

In the figures:
1—charging case; 11—shell light guide element; 111—inner light guide element; 112—outer light guide element;
2—earphone; 21—light source; 22—earphone light guide element; 221—inclined surface.

DESCRIPTION OF THE EMBODIMENTS

Embodiments of the present utility model are described in detail below. Examples of the embodiments are shown in the accompanying drawings, where identical or similar reference numerals throughout indicate identical or similar parts or parts having identical or similar functions. The embodiments described below with reference to the accompanying drawings are exemplary, are intended to explain the present utility model, and cannot be construed as limitations to the present utility model.

In the description of the present utility model, unless otherwise specified and defined, the terms "coupled", "connected", and "fixed" should be generally understood, for example, the "connected" can be fixedly connected, detachably connected, mechanically connected, electrically connected, directly connected, connected by a medium, or internal communication between two elements. For those of ordinary skill in the art, specific meanings of the terms described above in the present utility model can be construed according to specific circumstances.

In the description of the present utility model, unless otherwise specified and defined, a first feature "above" or "below" a second feature can include direct contact between the first feature and the second feature, or can include contact between the first feature and the second feature not directly but through another feature therebetween. In addition, the first feature "on", "above", and "over" the second feature includes the first feature directly above and obliquely above the second feature, or merely indicates that the first feature is horizontally higher than the second feature. The first feature "under", "below", and "beneath" the second feature includes the first feature right below and obliquely below the second feature, or merely indicates that the first feature is horizontally lower than the second feature.

A technical solution of the present utility model is further explained with reference to the accompanying drawings and through specific implementations.

As shown in FIGS. 1-5, an embodiment of the present utility model provides a light guide structure of an earphone charging case, including a charging case 1 and earphones 2. A shell of the charging case 1 is provided with a shell light guide element 11, and the shell light guide element 11 penetrates the shell, that is, one end of the shell light guide element 11 is located inside the shell and the other end is located outside the shell, which facilitates light reception of the shell light guide element 11 and observation of a user. The earphone 2 is provided with a light source 21, and the light source 21 is a light-emitting diode (LED) light source and is disposed on a circuit board. When the earphone 2 is placed in the charging case 1, light generated by the light source 21 on the earphone 2 may be transmitted to the shell light guide element 11, so that the shell light guide element 11 emits light.

It may be understood that the shell of the charging case 1 is light-tight and the shell light guide element 11 is made of a light-transmitting material, so that the shell light guide element has a better display effect.

According to the light guide structure of an earphone charging case, the light source 21 of the earphone 2 is directly used through optical simulation so as to realize secondary light guide, so that the shell of the charging case 1 emits light, no additional light source is required, costs are reduced, a size of the charging case may be effectively reduced, and miniaturization and lightweight may be realized.

Figure 2:
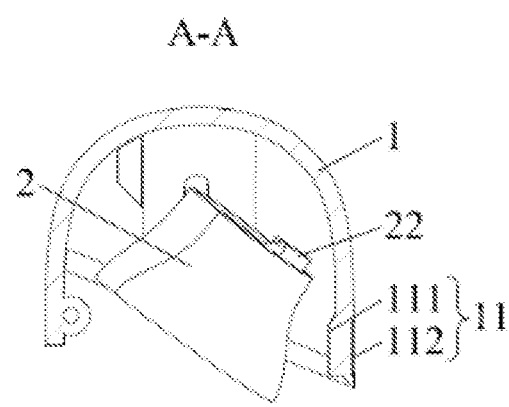
FIG. 2 is a cross-sectional view of A-A in FIG. 1.
Figure 4:
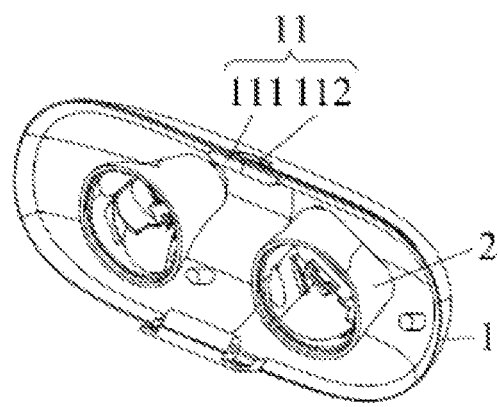
FIG. 4 is a second schematic structural diagram of a light guide structure of an earphone charging case according to an embodiment of the present utility model.

With further reference to FIGS. 1, 2, and 4, the shell light guide element 11 includes an inner light guide element 111 and an outer light guide element 112, both an inner wall and an outer wall of the shell of the charging case 1 are provided with mounting holes, the mounting hole on the inner wall and the mounting hole on the outer wall are in communication with each other, the inner light guide element 111 is embedded in the mounting hole on the inner wall of the shell, and the outer light guide element 112 is embedded in the mounting hole on the outer wall of the shell. When the light source 21 of the earphone 2 generates light, the inner light guide element 111 absorbs the light and transmits the light to the outer light guide element 112, so that the outer light guide element 112 emits light. This structure is more reasonable and facilitates mounting.

Further, a cross-sectional area of the inner light guide element 111 is greater than that of the outer light guide element 112. In this structure, the inner light guide element 111 has a greater cross-sectional area, so that the inner light guide element 111 receives the light emitted from the light source 21 of the earphone 2 conveniently, and the outer light guide element 112 emits light; and the outer light guide element 112 has a smaller cross-sectional area, so that overall appearance is more attractive.

Figure 3:
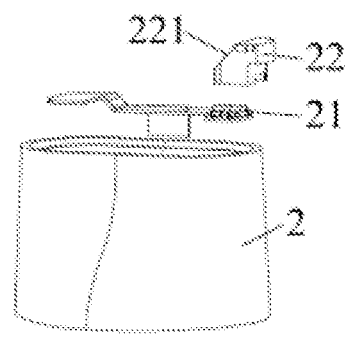
FIG. 3 is a schematic structural diagram of an earphone according to an embodiment of the present utility model.

With reference to FIG. 3, in order to condense light of the light source 21 of the earphone 2 and transmit the light at a set refraction angle, the light source 21 of the earphone 2 is provided with an earphone light guide element 22. The light generated by the light source 21 of the earphone 2 may be transmitted to the inner light guide element 111 through the earphone light guide element 22, and further the inner light guide element 111 transmits the light to the outer light guide element 112.

Specifically, the earphone light guide element 22 is L-shaped, an entry end of the earphone light guide element 22 is provided with an avoidance groove, the earphone light guide element 22 is disposed on a circuit board, the light source 21 of the earphone 2 is located in the avoidance groove of the earphone light guide element 22, and the light generated by the light source 21 of the earphone 2 is refracted by 90° and is emitted from an exit end of the earphone light guide element 22. This structure makes light transmission efficiency higher and energy loss lower.

Further, an outer corner of the earphone light guide element 22 is provided with an inclined surface 221, and the light generated by the light source 21 of the earphone 2 is refracted at the inclined surface 221 and is emitted, so that refraction efficiency is further improved.

Preferably, an outer surface of the earphone light guide element 22 is machined through a mirror polishing process so as to improve the light transmission efficiency.

Figure 5:
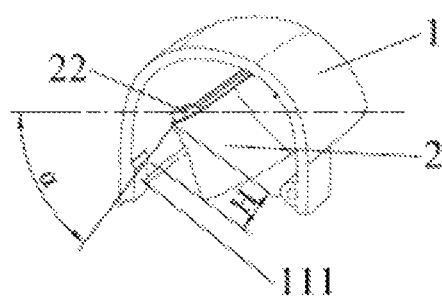
FIG. 5 is a diagram of a position relationship between an earphone light guide element and an inner light guide element according to an embodiment of the present utility model.

With reference to FIG. 5, a distance H between the exit end of the earphone light guide element 22 and the inner light guide element 111 is 4 mm-7 mm, and the light emitted by the light source 21 of the earphone 2 through the exit end of the earphone light guide element 22 is transmitted to the inner light guide element 111 within a distance range, so that a light utilization rate is relatively high.

When the charging case 1 is placed vertically as shown in FIG. 1, an angle $\alpha$ between a line of light emitted from the exit end of the earphone light guide element 22 to the inner light guide element 111 and a horizontal line is 20°-45°.

In this embodiment, the earphone light guide element 22 has a transmittance of 80%, so that the earphone light guide element 22 has relatively high light transmission efficiency; and the inner light guide element 111 and the outer light guide element 112 have a transmittance of 50%, so that a light-emitting display effect is desirable.

In this embodiment, the two earphones 2 in the charging case 1 are each provided with the light source 21 and the earphone light guide element 22, and the light sources 21 of the two earphones 2 transmit light to the shell light guide element 11 through the earphone light guide elements 22, so as to improve the light-emitting display effect of the shell light guide element 11.

Apparently, the foregoing embodiments of the present utility model are only for clearly explaining the examples of the present utility model, but are not intended to limit the implementations of the present utility model. Other variations or modifications of different forms can be made by those of ordinary skill in the art on the basis of the foregoing description. There is no need and no way to exhaust all the implementations. Any modification, equivalent substitution, improvement, etc. made within the spirit and principle of the present utility model shall be included in the protection scope of the claims of the present utility model.

What is claimed is:

1. A light guide structure of an earphone charging case, comprising
a charging case (1), wherein a shell of the charging case (1) is provided with a shell light guide element (11), and the shell light guide element (11) penetrates the shell; and
earphones (2), wherein the earphone (2) is provided with a light source (21), and the light source (21) is capable of transmitting light to the shell light guide element (11) when emitting light, so that the shell light guide element (11) emits light;
wherein the light source (21) is provided with an earphone light guide element (22), and for the earphone light guide element (22), the light generated by the light source (21) is transmitted to the shell light guide element (11) through the earphone light guide element (22).

2. The light guide structure of an earphone charging case according to claim 1, wherein the shell light guide element (11) comprises an inner light guide element (111) and an outer light guide element (112), the inner light guide element (111) is embedded in an inner wall of the shell, the outer light guide element (112) is embedded in an outer wall of the shell, and the inner light guide element (111) is capable of transmitting the light to the outer light guide element (112).

3. The light guide structure of an earphone charging case according to claim 2, wherein a cross-sectional area of the inner light guide element (111) is greater than that of the outer light guide element (112).

4. The light guide structure of an earphone charging case according to claim 3, wherein the earphones (2) are both provided with the light sources (21).

5. The light guide structure of an earphone charging case according to claim 2, wherein the earphones (2) are both provided with the light sources (21).

6. The light guide structure of an earphone charging case according to claim 1, wherein the earphone light guide element (22) is L-shaped, the light source (21) is disposed at an entry end of the earphone light guide element (22), and the light generated by the light source (21) is refracted by 90° and is emitted from an exit end of the earphone light guide element (22).

7. The light guide structure of an earphone charging case according to claim 6, wherein an outer corner of the earphone light guide element (22) is provided with an inclined surface (221).

8. The light guide structure of an earphone charging case according to claim 7, wherein the earphones (2) are both provided with the light sources (21).

9. The light guide structure of an earphone charging case according claim 6, wherein the earphones (2) are both provided with the light sources (21).

10. The light guide structure of an earphone charging case according to claim 1, wherein an outer surface of the earphone light guide element (22) is machined through a mirror polishing process.

11. The light guide structure of an earphone charging case according to claim 10, wherein the earphones (2) are both provided with the light sources (21).

12. The light guide structure of an earphone charging case according to claim 1, wherein a distance H between the exit end of the earphone light guide element (22) and a portion, protruding from the inner wall of the shell, of the shell light guide element (11) is 4 mm-7 mm.

13. The light guide structure of an earphone charging case according to claim 12, wherein the earphones (2) are both provided with the light sources (21).

14. The light guide structure of an earphone charging case according to claim 1, wherein the shell light guide element (11) has a transmittance of 50%, and the earphone light guide element (22) has a transmittance of 80%.

15. The light guide structure of an earphone charging case according to claim 14, wherein the earphones (2) are both provided with the light sources (21).

16. The light guide structure of an earphone charging case according to claim 1, wherein the earphones (2) are both provided with the light sources (21).

* * * * *